United States Patent
Wu et al.

(10) Patent No.: US 8,103,218 B2
(45) Date of Patent: Jan. 24, 2012

(54) METHOD AND APPARATUS FOR SCHEDULING TRANSMISSIONS IN A WIRELESS COMMUNICATION SYSTEM

(75) Inventors: Xiaoxin Wu, Beijing (CN); Guangjie Li, Beijing (CN); Ma Zhangyong, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 11/966,859

(22) Filed: Dec. 28, 2007

(65) Prior Publication Data

US 2009/0040936 A1 Feb. 12, 2009

Related U.S. Application Data

(60) Provisional application No. 60/955,155, filed on Aug. 10, 2007.

(51) Int. Cl.
    *H04B 17/00* (2006.01)
(52) U.S. Cl. .......... 455/67.11; 455/67.13; 370/252
(58) Field of Classification Search ........... 455/67.11, 455/67.13, 522, 561; 370/334, 206, 329, 370/458
    See application file for complete search history.

(56) References Cited

U.S. PATENT DOCUMENTS

| 2007/0086379 A1* | 4/2007 | Takayanagi et al. | 370/329 |
| 2007/0104149 A1* | 5/2007 | Khan et al. | 370/334 |
| 2007/0149233 A1* | 6/2007 | Wang et al. | 455/522 |

FOREIGN PATENT DOCUMENTS

EP        1806940 A1 * 7/2007

* cited by examiner

*Primary Examiner* — Lana N Le
*Assistant Examiner* — Golam Sorowar
(74) *Attorney, Agent, or Firm* — Blakely, Sokoloff, Taylor & Zafman LLP

(57) ABSTRACT

Machine-readable media, methods, apparatus and system for scheduling transmissions in a wireless communication system are described. In some embodiments, a base station may comprise a network interface device to receive and process a long-term signal to interference plus noise ratio (SINR) and a channel quality indicator (CQI) from each subscriber station of a plurality of subscriber stations; a reference signal to interference plus noise ratio determining logic to determine a reference signal to interference plus noise ratio (Ref_SINR) for the each subscriber station; and a target fairness factor determining logic to determine a target fairness factor (TFF) for the each subscriber station; a real fairness factor determining logic to determine a real fairness factor (RFF) for the each subscriber station; and a pseudo CQI calculating logic to calculate a pseudo CQI for the each subscriber station based at least in part on the CQI, SINR, Ref_SINR, TFF and RFF.

14 Claims, 3 Drawing Sheets

METHOD AND APPARATUS FOR SCHEDULING TRANSMISSIONS IN A WIRELESS COMMUNICATION SYSTEM

RELATED APPLICATION

This application claims benefit of U.S. Provisional Application No. 60/955,155, filed on Aug. 10, 2007. The entire teachings of the above application are incorporated herein by reference.

BACKGROUND

In a wireless communication system, such as an orthogonal frequency division multiplexing (OFDM) system, various scheduling methods are used to allocate transmission resources among a plurality of subscriber stations, such as a Max CII scheduling method, a proportional fairness scheduling method and a round robin scheduling method. Examples of the transmission resources may comprise resource blocks that may be determined by time slots and frequency domains.

The Max CII scheduling method may allocate transmission resources to a subscriber station with best channel quality. The round robin scheduling method may allocate transmission resources cyclically to each subscriber station without consideration of a current channel quality. The proportional fairness scheduling method may allocate transmission resources in a fair way while trying to achieve a higher throughput than round robin, based upon a resource allocation history and the current channel quality.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes method and apparatus for scheduling transmissions in a wireless communication system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or sending information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
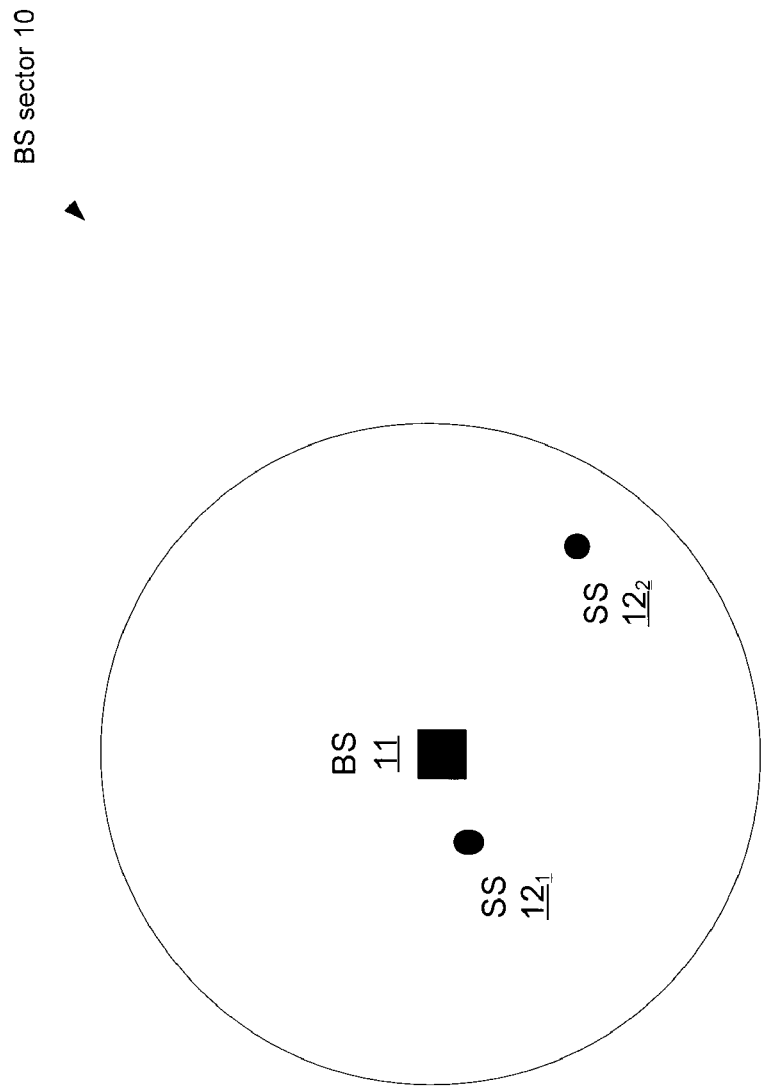
FIG. 1 shows an embodiment of a base station sector in a wireless communication system.

FIG. 1 shows an embodiment of a base station sector 10 in a wireless communication system, for example, an OFDM system. Base station sector 10 may be a service sector covered by a base station 11 to receive or transmit data from or to a plurality of subscriber stations (or mobile stations) such as subscriber stations $12_1$ and $12_2$. Examples of the subscriber stations may comprise portable computers, laptop computers, tablets, personal digital assistants (PDAs), handheld devices, entertainment devices such as audio and/or video devices, and other devices for processing or transmitting information in a wireless environment.

Base station 11 may divide transmission resources of base station sector 10 into several small blocks, such as resource blocks that may be defined by time slots and frequency domains. Base station 11 may select a subscriber station from the plurality of subscriber stations based upon a scheduling algorithm, and allocate a transmission resource (e.g., a resource block) to the selected subscriber station so that base station 11 may receive or transmit data from or to the selected subscriber station via the transmission resource.

Figure 2:
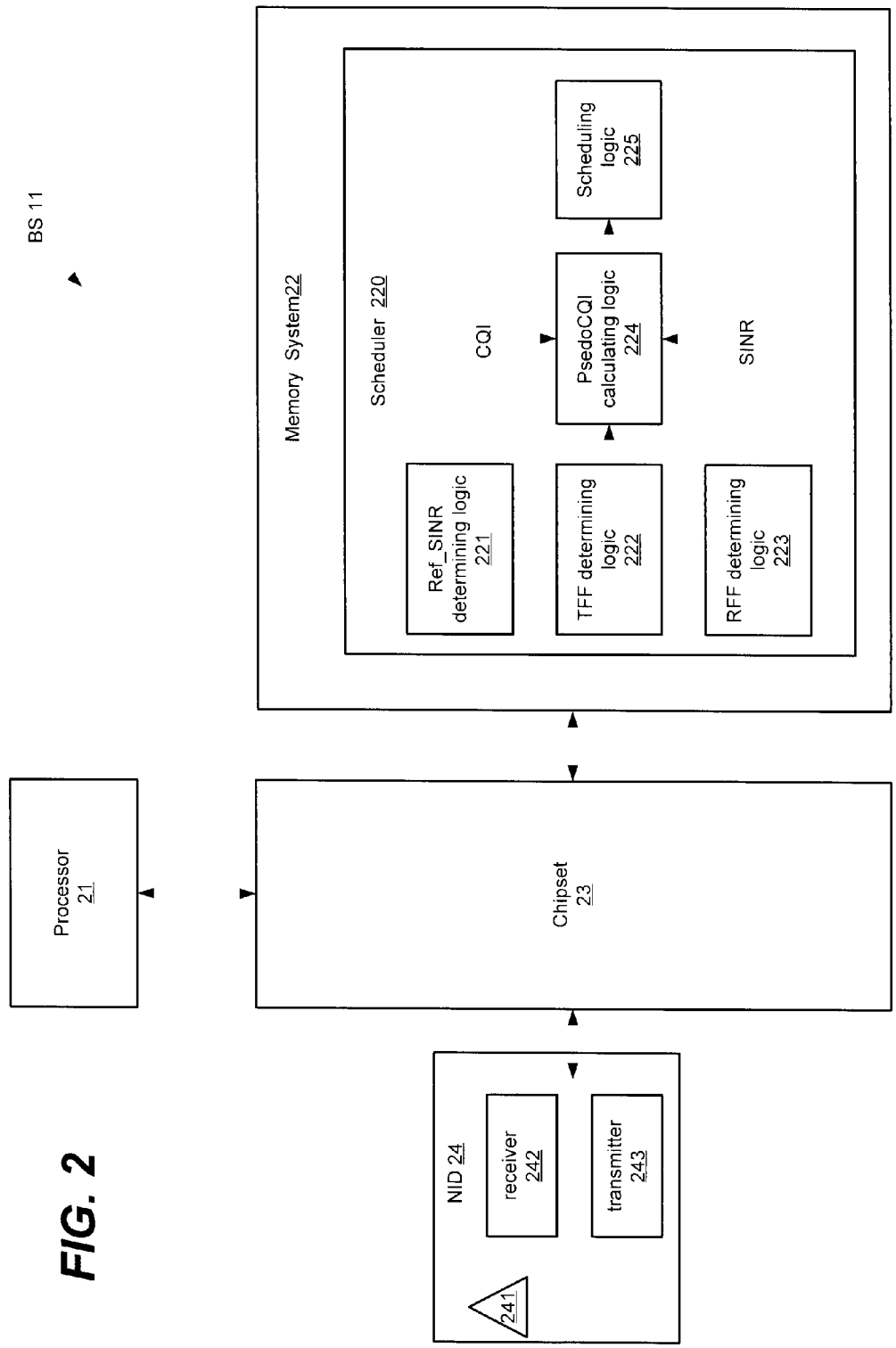
FIG. 2 shows an embodiment of a base station.

FIG. 2 shows an embodiment of base station 11. Base station 11 may comprise one or more processor 21, memory system 22, chipset 23, network interface device (NID) 24, and possibly other components.

One or more processors 21 may be communicatively coupled to various components (e.g., the chipset 23) via one or more buses such as a processor bus. Processors 21 may be implemented as an integrated circuit (IC) with one or more processing cores that may execute codes under a suitable architecture.

Memory 22 may store instructions and data to be executed by the processor 21. Examples for memory 22 may comprise one or any combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

In an embodiment, memory 22 may store instructions and data functioning as a scheduler 220 that may schedule transmissions for the plurality of subscriber stations, such as subscriber stations $12_1$ and $12_2$.

Scheduler 220 may comprise a reference long-term signal to interference plus noise ratio (Ref_SINR) determining logic 221, a target fairness factor (TFF) determining logic 222, a real fairness factor (RFF) determining logic 223, a Pseudo channel quality indicator (CQI) calculating logic 224 and a scheduling logic 225.

Ref_SINR determining logic 221 may determine a Ref_SINR for each of the plurality of subscriber stations, in which Ref_SINR$_k$ may represent a Ref_SINR for subscriber k, for example, Ref_SINR$_1$ for subscriber station 1 and Ref_SINR$_2$ for subscriber station 2. Ref_SINR$_k$ may correspond to a real long-term signal to interference plus noise ratio for the subscriber station k (i.e., SINR$_k$), in which Ref_SINR$_k$ may be determined by base station 11 while SINR$_k$ may be determined by the subscriber station k itself. The SINR$_k$ may somehow reflect a channel condition of the subscriber station k.

Several schemes may be adopted to determine the Ref_SINR. In an embodiment, an equal Ref_SINR may be assigned to each of the plurality of subscriber stations, in which case good system fairness may be achieved. In another embodiment, different Ref_SINRs may be assigned to different subscriber stations, in which case high system throughput may be achieved. In the another embodiment, the different Ref_SINRs may be assigned based upon various factors, such as different bandwidth share demands from the different subscriber stations and/or different SINRs for the different subscriber stations. For example, a high Ref_SINR may be assigned to a subscriber station requiring a high bandwidth share and/or having a high SINR, and vice versa.

TFF determining logic 222 may determine a TFF for each of the plurality of subscriber stations, in which TFF$_k$ may represent the target fairness factor for subscriber station k, for example, TFF$_1$ for subscriber station 1 and TFF$_2$ for subscriber station 2. TFF$_k$ may reflect a ratio of transmission resources targeted for the subscriber station k to transmission resources that the base station owns.

Several schemes may be adopted to determine the TFF. In an embodiment, an equal TFF may be assigned to each of the plurality of subscriber stations, in which case good system fairness may be achieved. In another embodiment, different TFFs may be assigned to different subscriber stations, in which case high system throughput may be achieved. In the another embodiment, the different TFFs may be assigned based upon various factors, such as different transmission demands from the different subscriber stations. For example, a high TFF may be assigned to a subscriber station having a high demand on transmission quality and/or transmission rate.

RFF determining logic 223 may determine a real fairness factor (TFF) for each of the plurality of subscriber stations, in which RFF$_k$ may represent the real fairness factor for subscriber station k, for example, RFF$_1$ for subscriber station 1 and RFF$_2$ for subscriber station 2. RFF$_k$ may reflect a ratio of transmission resources that have been assigned to the subscriber station k to the transmission resources that the base station owns. RFF determining logic 223 may determine the RFF by monitoring the real resource assignments among the plurality of subscriber stations during a certain period of time, for example, within several windows.

Pseudo CQI calculating logic 224 may calculate a pseudo channel quality indicator (CQI) for each subscriber station based upon the Ref_SINR, TFF, RFF, SINR and CQI for the each subscriber station, in which SINR and CQI are received from the each subscriber station via a network interface device (NID) 24 of base station 11.

In an embodiment, Pseudo CQI calculating logic 224 may calculate the Pseudo CQI according to the following equations:

$$\text{Pseudo CQI}_k = \text{CQI}_k + \text{Ref\_SINR}_k - \text{SINR}_K + \text{step, if RFF}_k \leq \text{TFF}_k;$$

$$\text{Pseudo CQI}_k = \text{CQI}_k + \text{Ref\_SINR}_k - \text{SINR}_K - \text{step, if RFF}_k \geq \text{TFF}_k,$$

wherein, Pseudo CQI$_k$ may represent the pseudo channel quality indicator for the subscriber station k, CQI$_k$ may represent the channel quality indicator for the subscriber station k, Ref_SINR$_k$ may represent the reference long-term signal to interference plus noise ratio for the subscriber station k, SINR$_K$ may represent the long-term signal to interference plus noise ratio for the subscriber station k, RFF$_k$ may represent the real fairness factor for the subscriber station k and TFF$_k$ may represent the target fairness factor for the subscriber station k, and step may represent a predetermined value.

Scheduling logic 225 may schedule transmissions for the plurality of subscriber stations based upon the Pseudo CQIs. In an embodiment, scheduling logic 225 may select a subscriber station with the best Pseudo CQI, and assign a transmission resource (e.g., a resource block) to the selected subscriber station so that base station 11 may receive or transmit a frame from or to the selected subscriber station via the transmission resource. Preferably, scheduling logic 225 may do such a scheduling for each frame transmission.

Chipset 23 may provide one or more communicative paths among one or more processors 21, memory 22 and other components, such as NID 24. NID 24 may input or output data streams to or from base station 11. In an embodiment, NID 24 may include an antenna array 241, a receiver 242 and a transmitter 243. Receiver 242 may process the data streams received via antenna array 241, for example, radio frequency to base frequency transformation, analog to digital transformation, demodulation, etc. On the contrary, transmitter 243 may process the data streams to be transmitted via antenna array 241, for example, modulation, digital to analog transformation, base frequency to radio frequency transformation, etc.

Figure 3:
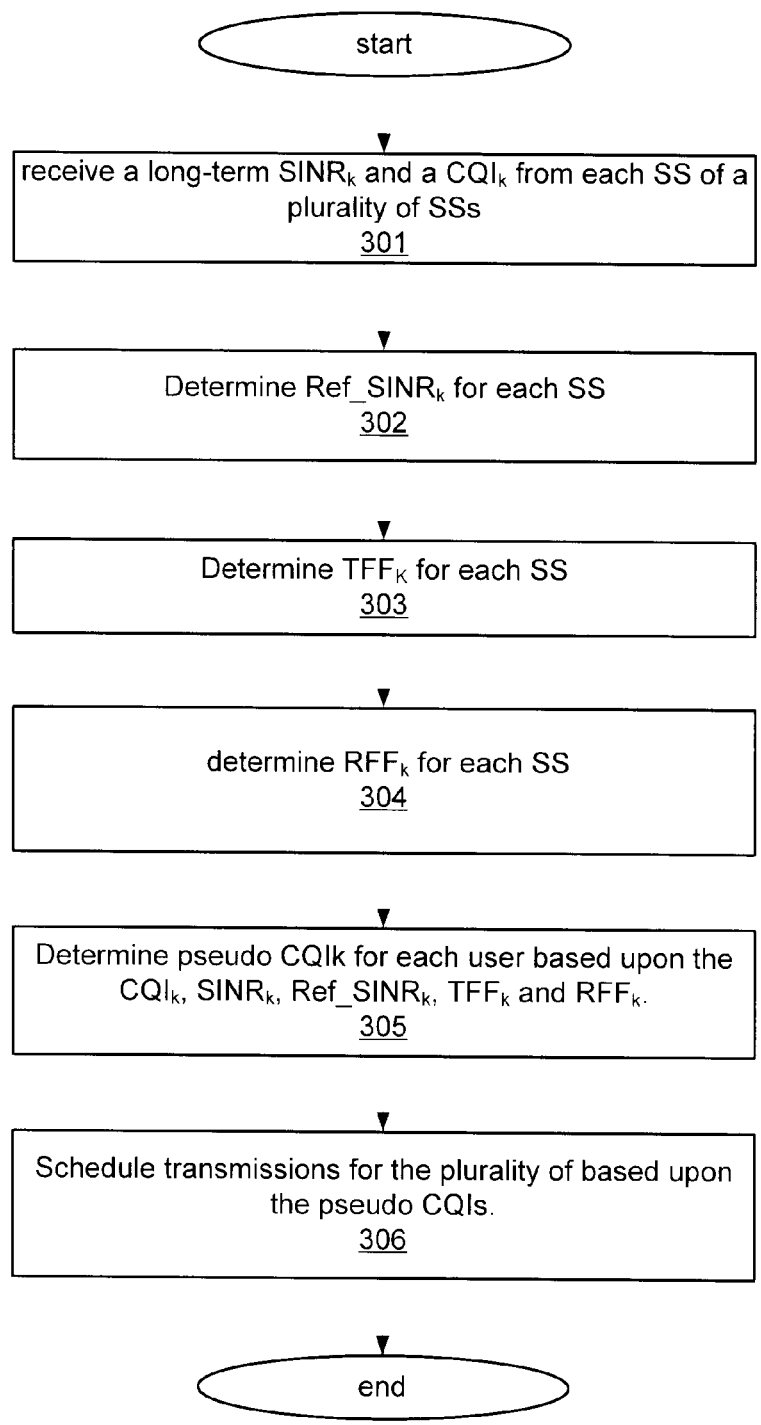
FIG. 3 shows an embodiment of a method of scheduling transmissions in the wireless communication system.

FIG. 3 may illustrate an embodiment of a method of scheduling transmissions in the wireless communication system. In block 301, base station 11 may receive a long-term SINR and a CQI from each subscriber station of a plurality of subscriber stations. In block 302, base station 11 may determine a Ref_SINR for the each subscriber station. An extreme case is that an equal Ref_SINR may be determined for the each subscriber station.

In block 303, base station 11 may determine a target fairness factor for the each subscriber station. An extreme case is that an equal TFF may be determined for the each subscriber station. In block 304, base station 11 may determine a RFF for the each subscriber station, for example, by monitoring real recourse assignments among the subscriber stations during a predetermined period of time. In block 305, base station 11 may calculate a Pseudo CQI for the each subscriber station based upon the above-stated CQI, SINR, Ref_SINR, TFF and RFF. In block 306, base station 11 may schedule transmissions for the plurality of subscriber stations. For example, base station 11 may select a subscriber station with the best Pseudo CQI to serve.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method operated by a base station, comprising:
receiving a long-term signal to interference plus noise ratio (SINR) and a channel quality indicator (CQI) from each subscriber station of a plurality of subscriber stations;
determining a reference signal to interference plus noise ratio (Ref_SINR) for the each subscriber station;
determining a target fairness factor (TFF) for the each subscriber station, wherein the target fairness factor represents a ratio of resources targeted for the each subscriber station to resources that the base station has;
determining a real fairness factor (RFF) for the each subscriber station, wherein the real fairness factor represents a ratio of resources that have been assigned to the each subscriber station to the resources that the base station has; and
calculating a pseudo CQI for the each subscriber station based on the CQI, SINR, Ref_SINR, TFF and RFF for the each subscriber station.

2. The method of claim 1, wherein the determining the Ref_SINR for the each subscriber station is performed based at least in part on a bandwidth share demand from the each subscriber station.

3. The method of claim 1, wherein an equal SINR is determined for the each subscriber station.

4. The method of claim 1, wherein the determining the TFF for the each subscriber station is performed based at least in part on a transmission demand for the each subscriber station.

5. The method of claim 1, wherein an equal TFF is determined for the each subscriber station.

6. The method of claim 1, wherein the calculating the pseudo CQI for the each subscriber station is performed based upon the following equation:

pseudo $CQI_k = CQI_k + Ref\_SINR_k - SINR_k + step$, if $RFF_k \leq TFF_k$; and pseudo $CQI_k = CQI_k + Ref\_SINR_k - SINR_k - step$, if $RFF_k \geq TFF_k$;

wherein, pseudo $CQI_k$ represents the pseudo CQI for a subscriber station k, $CQI_k$ represents the CQI for the subscriber station k, $Ref\_SINR_k$ represents the Ref_SINR for the subscriber station k, $SINR_k$ represents the SINR for the subscriber station k; $RFF_k$ represents the RFF for the subscriber station k; $TFF_k$ represents the TFF for the subscriber station k; and step is a predetermined value.

7. The method of claim 1, further comprising selecting a subscriber station from the plurality of subscriber stations to receive or transmit a frame from or to the subscriber station, based at least in part on the pseudo CQI for the each subscriber station, wherein the subscriber station has the best pseudo CQI among the plurality of subscriber stations.

8. A base station, comprising:
a network interface device to receive and process a long-term signal to interference plus noise ratio (SINR) and a channel quality indicator (CQI) from each subscriber station of a plurality of subscriber stations;
a reference signal to interference plus noise ratio determining logic to determine a reference signal to interference plus noise ratio (Ref_SINR) for the each subscriber station;
a target fairness factor determining logic to determine a target fairness factor (TFF) for the each subscriber station, wherein the target fairness factor represents a ratio of resources targeted for the each subscriber station to resources that the base station has;
a real fairness factor determining logic to determine a real fairness factor (RFF) for the each subscriber station, wherein the real fairness factor represents a ratio of resources that have been assigned to the each subscriber station to the resources that the base station has; and
a pseudo CQI calculating logic to calculate a pseudo CQI for the each subscriber station based on the CQI, SINR, Ref_SINR, TFF and RFF for the each subscriber station.

9. The base station of claim 8, wherein the Ref_SINR determining logic is to determine the Ref_SINR for the each subscriber station based at least in part on a bandwidth share demand from the each subscriber station.

10. The base station of claim 8, wherein an equal Ref_SINR is determined for the each subscriber station.

11. The base station of claim 8, wherein the TFF determining logic is to determine the TFF for the each subscriber station based at least in part on a transmission demand from the each subscriber station.

12. The base station of claim 8, wherein an equal TFF is determined for the each subscriber station.

13. The base station of claim 8, wherein the pseudo CQI calculating logic is to calculate the pseudo CQI for the each subscriber station based upon the following equation:

pseudo $CQI_k = CQI_k + Ref\_SINR_k - SINR_k + step$, if $RFF_k \leq TFF_k$; and pseudo $CQI_k = CQI_k + Ref\_SINR_k - SINR_k - step$, if $RFF_k \geq TFF_k$;

wherein, pseudo $CQI_k$ represents the pseudo CQI for a subscriber station k, $CQI_k$ represents the CQI for the subscriber station k, $Ref\_SINR_k$ represents the Ref_SINR for the subscriber station k, $SINR_k$ represents the SINR for the subscriber station k; $RFF_k$ represents the RFF for the subscriber station k; $TFF_k$ represents the TFF for the subscriber station k; and step is a predetermined value.

14. The base station of claim 8, further comprising a scheduling logic to select a subscriber station from the plurality of subscriber stations to receive or transmit a frame from or to the subscriber station, based at least in part on the pseudo CQI for the each subscriber station, wherein the subscriber station has the best pseudo CQI among the plurality of subscriber stations.

* * * * *